(12) United States Patent
Christensen et al.

(10) Patent No.: US 6,944,681 B1
(45) Date of Patent: Sep. 13, 2005

(54) PROBING ALGORITHM FOR FOUNDATION FIELDBUS PROTOCOL

(75) Inventors: Dan Dean Christensen, Austin, TX (US); Ram Ramachandran, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 784 days.

(21) Appl. No.: 09/658,607

(22) Filed: Sep. 8, 2000

(51) Int. Cl.$^7$ .............................................. G06F 3/00
(52) U.S. Cl. ............................ 710/8; 710/17; 710/18; 710/46; 710/220
(58) Field of Search ............................... 710/8, 17, 18, 710/46, 220

(56) References Cited

U.S. PATENT DOCUMENTS

| | | | |
|---|---|---|---|
| 4,763,323 A * | 8/1988 | Nelson et al. ............... | 370/449 |
| 5,793,307 A * | 8/1998 | Perreault et al. ......... | 340/825.5 |
| 5,980,078 A | 11/1999 | Krivoshein et al. ......... | 364/131 |
| 6,006,017 A * | 12/1999 | Joshi et al. .................. | 709/224 |
| 6,424,872 B1 * | 7/2002 | Glanzer et al. ............... | 700/18 |

FOREIGN PATENT DOCUMENTS

| | | |
|---|---|---|
| GB | 2352147 A | 1/2001 |

OTHER PUBLICATIONS

Search Report under Section 17 issued by the United Kingdom Patent Office on Apr. 18, 2002.

Examination Report under Section 18(3) issued in GB 0121759.5 application by the United Kingdom Patent Office on May 27, 2004.

* cited by examiner

*Primary Examiner*—Jeffrey Gaffin
*Assistant Examiner*—Niketa I Patel
(74) *Attorney, Agent, or Firm*—Marshall, Gerstein & Borun LLP (57) ABSTRACT

A hand-held communication control device which, when coupled to a process control system communication bus, controls communication occurring on the bus using a communication schedule that dictates when each of the devices coupled to the bus will be permitted to communicate on the bus. The hand-held communication control device further uses a probing algorithm to detect devices, including other communication control devices, that are coupled to the bus. The probing algorithm causes the hand-held communication control device to select an address from one of a set of three address lists to which a probe node message is then transmitted to detect the presence of a device at that address. One of the address lists is reserved for communication control devices and uses only a limited number of maximum possible addresses. The probe addresses are selected from each of the three address lists in a sequential manner and from among the three address lists in an alternating manner so that, when the communication control device takes control of a bus formerly controlled by another communication control device, the hand-held communication control device detects the presence of the other communication control device and relinquishes control of the bus to the other communication control device in a timely manner.

36 Claims, 5 Drawing Sheets

PROBING ALGORITHM FOR FOUNDATION FIELDBUS PROTOCOL

FIELD OF THE INVENTION

The present invention relates generally to a device and method for controlling communication on a process control network bus and, more specifically, to a communication control device that controls the order in which a set of probe signals are transmitted to a set of bus device addresses to detect the presence of another communication control device added to the bus.

DESCRIPTION OF THE RELATED ART

Large processes such as chemical, petroleum and other manufacturing and refining processes typically include numerous field devices disposed at various locations in a plant to measure and control process parameters, to thereby effect control of a process. These field devices which may be, for example, sensors such as temperature, pressure, and flow rate sensors as well as control elements such as valves and switches, are typically connected to one or more controllers or host devices which control operation of the field devices to thereby implement process control.

As is known, there are many standard, open communication protocols including, for example, the HART®, PROFIBUS®, WORLDFIP®, LONWORKS®, Device-Net®, and CAN protocols, which enable field devices made by different manufacturers to be used together within the same process control loop. In fact, any field device that conforms to one of these protocols can be used within a process to communicate with and to be controlled by a controller that supports the protocol, even if that field device is made by a different manufacturer than the controller manufacturer. The FOUNDATION™ Fieldbus protocol (hereinafter the "Fieldbus protocol"), provides or enables highly decentralized control by having process control devices, such as valve positioners, transmitters, etc. perform one or more process control functions and then communicating data across a bus structure for use by other process control devices. To implement these control functions, each process control device includes a microprocessor having the capability to perform or implement one or more basic control functions called function blocks as well as having the ability to communicate with other process control devices using the Fieldbus communication protocol. In this manner, field devices made by different manufacturers can be interconnected within a process control loop to communicate with one another and to perform one or more process control functions or control loops.

In the Fieldbus protocol, a device referred to as a link master is capable of operating as a link active scheduler ("LAS") to control access to the communication bus according to a communication schedule that dictates the time at which each of a set of active control/field devices will be allowed to communicate over the bus. More particularly, using the communication schedule as a guide, the LAS enables communication over the bus in either a synchronous or an asynchronous mode. Synchronous communication, also referred to as scheduled communication, occurs when the LAS cycles through a list of the devices coupled to the communication bus that are active or "live" and allows each of the active devices to communicate on the bus for a predetermined amount of time. The LAS typically cycles through all of the live devices at least once during every communication cycle or macrocycle, thereby allowing each active device to communicate in a synchronous fashion at least once every macrocycle. In addition to enabling synchronous communication, the LAS also provides additional communication time to any device having further information to transmit in what is termed the asynchronous or unscheduled communication mode.

Typically, a first link master device referred to as a primary link master device resides on the bus and serves as the primary LAS. The primary link master device is equipped with a primary link master flag that has been set to indicate that it is designated to operate as the primary LAS for controlling the bus. A second link master device, referred to as a back-up link master device, will generally also be coupled to the bus and is designated to operate as the LAS and control the bus in the event that the primary LAS goes out of service. The back-up link master device is configured to monitor the communication activity occurring on the bus and, if communication activity on the bus ceases for a predetermined amount of time, then the back-up link master device automatically takes control of the bus.

Because additional devices may be added to the communication bus at any time, in addition to controlling the synchronous and asynchronous communication, the link master operating as the LAS performs a probing algorithm that is used to detect the presence of devices that have been recently added to the communication bus. As part of the probing algorithm, the LAS sequentially probes addresses contained in two address lists. The first address list is reserved for addresses of permanent field devices such as host interfaces, transmitters, valves and other field devices and typically allows for approximately thirty-two field device addresses. The second address list is typically limited to eight device addresses and is used for temporary field devices such as handheld devices, or permanent devices that were not assigned a permanent address during configuration of the process. During operation, the probing algorithm causes a probe node message to be transmitted to a first device address in the first address list. After the probe node message has been sent, the LAS waits a predetermined amount of time for a response. If no response is received, then the LAS transmits a probe node message to a first device address in the second address list. If, again, no response is received, then the LAS transmits a probe node message to the second device address in the first address list and continues to sequentially cycle through all of the device addresses in the first and second address lists in this alternating manner. If a response to the probe node message is received, the LAS acknowledges the response and then moves the last-probed address from the address list in which it was stored to the list of active devices so that the newly added device at that address will be allowed to communicate on the bus in the synchronous and/or asynchronous mode. After moving the last-probed address to the list of active devices, the LAS continues to alternately cycle through the device addresses contained in the first and second address lists. When the last device address in either of the first and/or the second address lists has been probed, the LAS returns or "rolls over" to the beginning of that address list and continues to sequentially cycle through the addresses in each of the lists in the alternating manner describe above.

Although the Foundation Fieldbus protocol provides support for multiple link master devices, only one link master device is allowed to operate as the LAS and control communication on the bus, at any given time. Generally, this control scheme works well for the primary link master device and the back-up link master device because, during normal operation, the primary link master operates as the LAS to control the bus and the back-up link master device only steps in to take control of the bus when the primary link master device is out of service or goes off-line. When the primary link master devices comes back on-line, the back-up link master is configured to relinquish control to the primary link master device having the primary link master flag. However, there may be instances when a first link master device such as a primary link master device or a back-up link master device is operating as the LAS to control the bus and a hand-held link master device configured to operate as the LAS is inadvertently also coupled to the bus segment. When this occurs, both the first link master device and the hand-held link master device will try to control communication on the bus which will cause one of any number of protocol errors to be generated. Depending on which of the protocol errors is generated, one of either the first link master device or the hand-held link master device will relinquish control of the bus. The method by which protocol errors are generated and the methods by which one or more communication control devices respond to the protocol errors is well known in the art and, therefore, is not discussed further herein. If the first link master device maintains control of the bus, then no communication problems occur because the first link master device has the current communication schedule. If, however, the hand-held link master device gains control of the bus, then communication on the bus may be interrupted for most or all of the devices on the bus because the hand-held link master device does not have a current communication schedule. Moreover, the hand-held link master device will not relinquish control until the hand-held link master device has cycled through all of the probe addresses in the first and second address list and finally reaches and probes the address at which the first link master device is located at which time the first link master device will request transfer of control of the bus. The hand-held link master device will respond to the request by relinquishing control of the bus to the first link master device. The time necessary for the hand-held link master device to cycle through all of the device addresses in the first and the second address lists could be long enough for one or more of the active control/field devices coupled to the bus to be driven to a fault condition due to interrupted communication on the bus, thereby potentially disabling the process control system. As a result, there is a need in the art for a probing algorithm by which a hand-held LAS that has gained control of a bus formerly controlled by a first communication control device may relinquish control of the bus to the first communication control device in a timely manner.

SUMMARY OF THE INVENTION

The invention is directed to a communication control device for periodically sending probe signals, one at a time, via a communication bus to a plurality of device addresses on the bus to detect the presence of devices located at the device addresses. The communication control device includes a processor, a memory and a routine that is stored in the memory and that is adapted to be executed by the processor to select the plurality of device addresses to which a probe signal will be sent from among a first, second and third address list, the third of which contains addresses reserved for additional communication control devices. The routine causes each address in the third address list to be selected more frequently than each of the addresses in the first and second address lists.

In one embodiment of the invention, the control device further includes another routine adapted to send probe messages to each of the addresses selected from the first, second and third address lists to determine whether a device is located at each of the selected addresses. In another embodiment of the invention, each address selected from each of the first, second and third address lists is selected in a sequential order with rollover relative to the other addresses selected from that list. In yet another embodiment of the invention, a frequency at which any address in the third address list is selected is sufficient to prevent a set of active devices that are coupled to the communication bus from reaching a fault condition in the event that communication on the bus is temporarily interrupted.

The features and advantages of the present invention will be apparent to those of ordinary skill in the art in view of the detailed description of the preferred embodiment, which is made with reference to the drawings, a brief description of which is provided below.

DESCRIPTION OF THE PREFERRED EMBODIMENTS

While a communication control device and method are described in detail in conjunction with a process control network that implements process control functions in a decentralized or distributed manner using the Fieldbus protocol, it should be noted that the communication control device and/or the method described herein can be used with process control networks that perform control functions using other types of field devices or bus-based communication protocols, including protocols that rely on other than two-wire buses and protocols that support both analog and digital communications. Thus, for example, the communication control device described herein can be used in any process control network that performs distributed control functions even if this process control network uses the HART, PROFIBUS, etc. communication protocols or any other communication protocols that now exist or that may be developed in the future.

Before discussing the details of the communication control device, a general description of the Fieldbus protocol, field devices configured according to this protocol, and the way in which communication and process control occurs in a process control network that uses the Fieldbus protocol will be provided. However, it should be understood that, while the Fieldbus protocol is a relatively new digital communication protocol developed for use in process control networks, this protocol is known in the art and is described in detail in numerous articles, brochures and specifications published, distributed and available from, among others, the Fieldbus Foundation, a not-for-profit organization headquartered in Austin, Tex.

Generally speaking, the Fieldbus protocol is an all-digital, serial, two-way communication protocol that provides a standardized physical interface to a two-wire loop or bus interconnecting "field" equipment such as sensors, actuators, controllers, valves, etc. located in an instrumentation or process control environment of, for example, a factory or a plant. The Fieldbus protocol provides, in effect, a local area network for field instruments (field devices) within a process facility, which enables these field devices to perform control functions at locations distributed throughout a process and to communicate with one another before and after the performance of these control functions to implement an overall control strategy. Because, the Fieldbus protocol enables control functions to be distributed throughout a process control network, it reduces the complexity of, or entirely eliminates the necessity of the centralized process controller.

Figure 1:
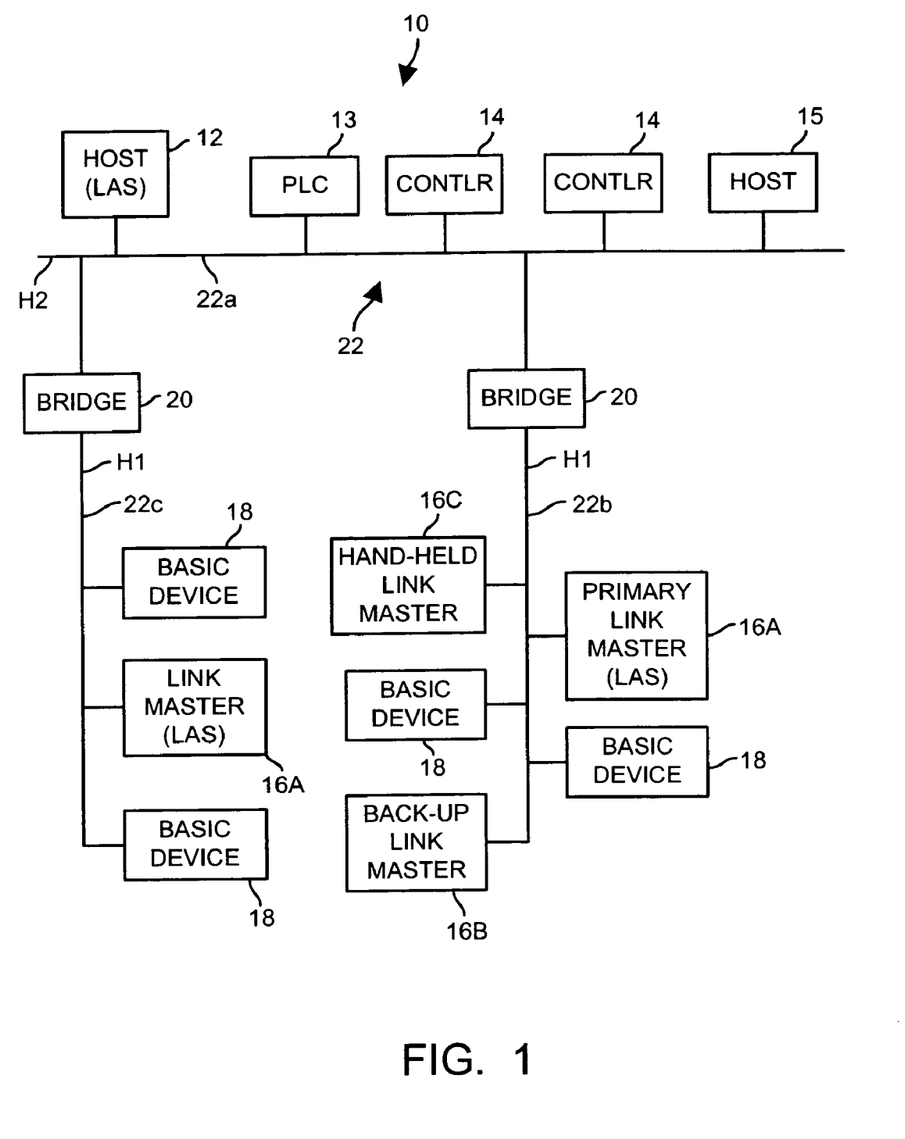
FIG. 1 is a schematic block diagram of a communication bus in a process control network using the Fieldbus protocol.

Referring to FIG. 1, wherein like reference numerals represent like devices, a process control network 10 using the Fieldbus protocol may include a host 12 connected to a number of other devices such as a program logic controller ("PLC") 13, a number of controllers 14, another host device 15 and a set of field devices 16A, 16B, 16C, 18 and 20 via a two-wire Fieldbus loop or bus 22. The bus 22 includes different sections or segments, 22a, 22b, 22c that are separated by bridge devices 20. Each of the sections 22a, 22b, and 22c interconnects a subset of the devices attached to the bus 22 to enable communications between the devices in a manner described hereinafter. Of course, the network of FIG. 1 is illustrative only, there being many other ways in which a process control network may be configured using the Fieldbus protocol. To enable configuration of the control system, a configurer is typically located in one of the devices, such as the host 12, and is responsible for setting up or configuring each of the devices (which are smart devices in that they each include a microprocessor capable of performing communication and, in some cases, control functions) as well as recognizing when new field devices are connected to the bus 22, when field devices are removed from the bus 22, receiving some of the data generated by the field devices 16A, 16B, 16C, 18 and 20, and interfacing with one or more user terminals, which may be located in the host 12 or in any other device connected to the host 12 in any manner.

Each of the devices 12–16A, 16B, 16C, 18, and 20 is capable of communicating over the bus 22 and, importantly is capably of independently performing one or more process control functions using data acquired by the device from the process or from a different device via communication signals on the bus 22. Fieldbus devices are, therefore, capable of directly implementing portions of an overall control strategy which, in the past were performed by a centralized digital controller of a DCS. To perform control functions, each Fieldbus device includes one or more standardized "blocks" which are implemented in a microprocessor within the device. In particular, each Fieldbus device includes one resource block and may include zero or more function blocks and zero or more transducer blocks. These blocks are referred to as block objects.

A resource block stores and communicates device specific data pertaining to some of the characteristics of a Fieldbus device including, for example, a device type, a device revision indication, and indications of where other device specific information may be obtained within a memory of the device. While different device manufacturers may store different types of data in the resource block of a field device, each field device conforming to the Fieldbus protocol includes a resource block that stores some data.

A function block defines and implements an input function, an output function, or a control function associated with the field device and, thus function blocks are generally referred to as input, output, and control function blocks. However, other categories of function blocks such as hybrid function blocks exist or may be developed in the future. Each input or output function block produces at least one process control input (such as a process variable from a process measurement device) or process control output (such as a valve position sent to an actuation device) while each control function block uses an algorithm (which may be proprietary in nature) to produce one or more process outputs from one or more process inputs and control inputs. Examples of standard function blocks include analog input ("AI"), analog output ("AO"), bias ("B"), control selector ("CS"), discrete input ("DI"), discrete output ("DO"), manual loader ("ML"), proportional/derivative ("PD"), proportional/integral/derivative ("PID"), ratio ("RA"), and signal selector ("SS") function blocks. However, other types of function blocks may be defined or created to operate in the Fieldbus environment.

A transducer block couples the inputs and outputs of a function block to local hardware devices, such as sensors and device actuators, to enable function blocks to read the outputs of local sensors and to command local devices to perform one or more functions, such as moving a valve member. Transducer blocks typically contain information that is necessary to interpret signals delivered by a local device and to properly control local hardware devices including, for example, information identifying the type of a local device, calibration information associated with a local device, etc. A single transducer block is typically associated with each input or output function block.

Importantly, each block is capable of communicating with other blocks in the same or different field devices over the Fieldbus bus using standard message formats defined by the Fieldbus protocol. As a result, combinations of function blocks (in the same or different devices) may communicate with each other to produce one or more decentralized control loops. Thus, for example, a PID function block in one field device may be connected via the bus 22 to receive an output of an AI function block in a second field device, to deliver data to an AO function block in a third field device and to receive an output of the AO function block as feedback to create a process control loop separate and apart from any DCS controller. In this manner, combinations of function blocks move control functions out of a centralized DCS environment, which allows DCS multi-function controllers to perform supervisory or coordinating functions or to be eliminated altogether. Furthermore, function blocks provide a graphical, block-oriented structure for easy configuration of a process and enable the distribution of functions among field devices from different suppliers because these blocks use a consistent communication protocol.

In addition to containing and implementing block objects, each field device includes one or more other objects including link objects, trend objects, alert objects and view objects. Link objects define the links between the inputs and outputs of blocks (such as function blocks) both internal to the field device and across the Fieldbus bus 22.

Trend objects allow local trending of function block parameters for access by other devices such as the host 12 or other controllers 14 of FIG. 1. Trend objects retain short-term historical data pertaining to some, for example, function block parameter and report this data to other devices or function blocks via the bus 22 in an asynchronous manner. Alert objects report alarms and events over the bus 22. These alarms or events may relate to any event that occurs within a device or one of the blocks of a device. View objects are predefined groupings of block parameters used in standard human/machine interfacing and may be sent to other devices for viewing from time to time.

The Fieldbus bus 22 supports or allows two-way, purely digital communication and may also provide a power signal to any or all of the devices coupled to the bus 22. Alternatively, any or all of the devices may have their own power supplies or may be connected to external power supplies via separate wires (not shown). The Fieldbus protocol classifies the devices that can be connected to the bus 22 into three categories, namely, basic devices 18, bridge devices 20 and communication control devices 16A, 16B and 16C, referred to as link master devices. Basic devices 18 can communicate, that is, send and receive communication signals on or from the bus, but are not capable of controlling the order or timing of communication that occurs on the bus. Bridge devices 20 are configured to communicate on and to interconnect individual segments or branches of a Fieldbus bus to create larger process control networks. If desired, bridge devices 20 may convert between different data speeds and/or different data signaling formats used on the different segments of the bus 22, may amplify signals traveling between the segments of the bus 22, may filter the signals flowing between the different segments of the bus 22 and pass only those signals destined to be received by a device on one of the bus segments to which the bridge is coupled and/or may take other actions necessary to link different segments of the bus 22. Bridge devices that connect bus segments that operate at different speeds must have link master capabilities at the lower speed segment side of the bridge.

The communication control devices, such as the link master devices 16A, 16B and 16C, are devices that communicate over the bus and that are capable of controlling the flow of and the timing of communication signals on the bus. These devices typically store a communication schedule which is used to control communications on the bus. Typically each bus segment 22 includes a primary link master device 16A that has been designated as the primary LAS for controlling the bus and a back-up link master device 16B that is designated to become the LAS and take control of the bus in the event that the primary link master device 16A goes out of service. In addition, a hand-held link master device 16C configured to operate as an LAS may be coupled inadvertently to the bus. In addition to the link master devices 16A, 16B and 16C, the hosts 12 and 15, the PLC 13, and the controllers 14, which may be any type of Fieldbus device, will typically also be capable of functioning as link master devices.

Figure 2:
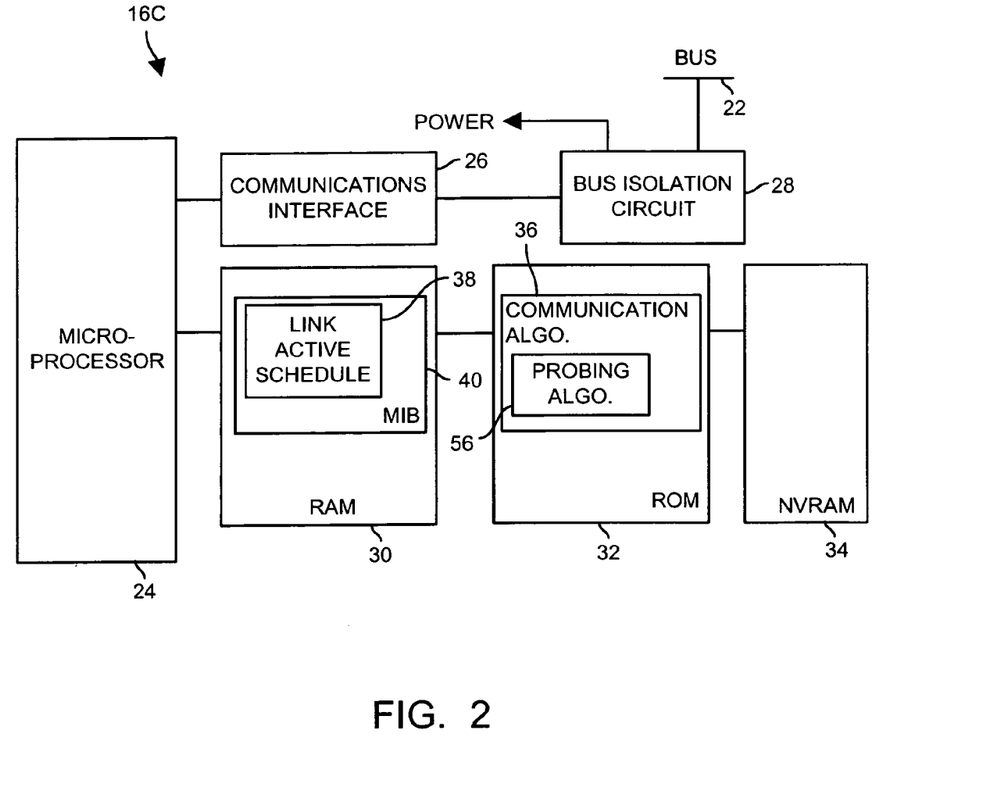
FIG. 2 is a block diagram of a communication control device, referred to as a hand-held link master device, that can be used to control communication on a segment of the communication bus of FIG. 1.

Referring also to FIG. 2, the hand-held link master device 16C includes components/circuits common to all link master devices such as a microprocessor 24, a communications interface 26, a bus isolation circuit 28, and a plurality of storage devices such as a random access memory ("RAM") 30, a read-only memory ("ROM") 32 and a non-volatile read-only memory ("NVRAM") 33. The communications interface 26 (which is bus connector) is a circuit that performs serial to parallel protocol conversion and parallel to serial protocol conversion and is used to add framing information to data packets according to any desired protocol definition, such as the Fieldbus protocol. The bus isolation circuit 28 converts a two-wire media communication signal supplied on the bus 22 to a digital representation of the communication signal and may perform waveshaping and signaling on the bus 22. Alternatively, the bus isolation circuit 28 of the hand-held link master device 16C may include a battery (not shown) adapted to supply power to the components of the hand-held link master device 16C. The hand-held link master device 16C may further include a plurality of other elements depending on whether the device is configured or otherwise adapted to perform duties additional to communication control.

Referring still to FIG. 2, although multiple link master devices 16A, 16B, 16C may be connected to any segment of the bus 22, only one of the multiple link master devices 16A, 16B or 16C may operate as a link active scheduler ("LAS") at any given time. The LAS actively schedules and controls communication on the segment of the bus 22 to which it is coupled using a communication algorithm 36 that is preferably implemented in a program code stored in the ROM 32 and that is executed by the microprocessor 24. During operation, the communication algorithm 36 accesses a communication schedule 38, also referred to as a link active schedule 38, that contains the times at which each function block of each device is scheduled to start periodic communication activity on the bus 22. The link active schedule 38 is stored in a database 40, referred to as a management information base ("MIB"), residing in the RAM 30 that may also be used to store other information such as, for example, virtual communication relationships (VCRs), dynamic variables, statistics, function block execution timing schedules and device tag and address information.

Generally speaking, in the Fieldbus protocol, synchronous communication activities over the bus 22 are divided into repeating macrocycles, each of which includes one synchronous or scheduled communication for each function block active on any particular segment of the bus. The Fieldbus protocol also allows asynchronous or unscheduled communication for one or more of the function blocks or devices active on a segment of the bus 22. During each macrocycle, each of the function blocks active on a particular segment of the bus executes, usually at a different, but precisely scheduled (synchronous) time and, at another precisely scheduled time, publishes its output data on that segment of the bus in response to a compel data command generated by the LAS controlling the bus. Preferably, each function block is scheduled to publish its output data shortly after the end of the execution period of the function block. Furthermore, the data publishing times of the different function blocks are scheduled serially so that no two function blocks on a particular segment of the bus publish data at the same time. During the time that synchronous communication is not occurring, the active LAS allows each field device, in turn, to transmit alarm data, view data, etc. in an asynchronous manner using token driven communications. The time at which each of the function blocks associated with each of the devices on a bus segment is scheduled to execute is stored in an MIB associated with the particular device and the times at which the LAS controlling the bus sends the compel data commands are stored in the MIB 40 of the LAS for that bus segment. These times are typically stored as offset times because they identify the times at which a function block is to execute or send data as an offset from each macrocycle repeat. The macrocycle is repeated continuously beginning from an "absolute link scheduling time," which is known by all of the field devices connected to the bus 22.

Thus, to effect communications during each macrocycle, the LAS controlling the bus sends a compel data command to each of the devices on the bus segment according to the list of transmit times stored in the link active schedule 38. Upon receiving a compel data command, a function block of a device publishes its output data on the bus 22. Because each of the function blocks is typically scheduled to execute so that execution of that block is completed shortly before the block is scheduled to receive a compel data command, the data published in response to a compel data command should be the most recent output data of the function block. However, if a function block is executing slowly and has not latched new outputs when it receives the compel data command, the function block publishes the output data generated during the last run of the function block.

When synchronous communication is not occurring, the LAS enables asynchronous communication by sending a pass token message to a particular field device. When a field device receives a pass token message, that field device has full access to the segment and can send asynchronous messages, such as alarm messages, trend data, operator set point changes, etc. until the messages are complete or until a maximum allotted "token hold time" has expired. Thereafter, the field device releases the segment bus and the LAS may send a pass token message to another device. This process may repeat until the LAS controlling the bus is scheduled to send a compel data command to effect synchronous communication.

Figure 3:
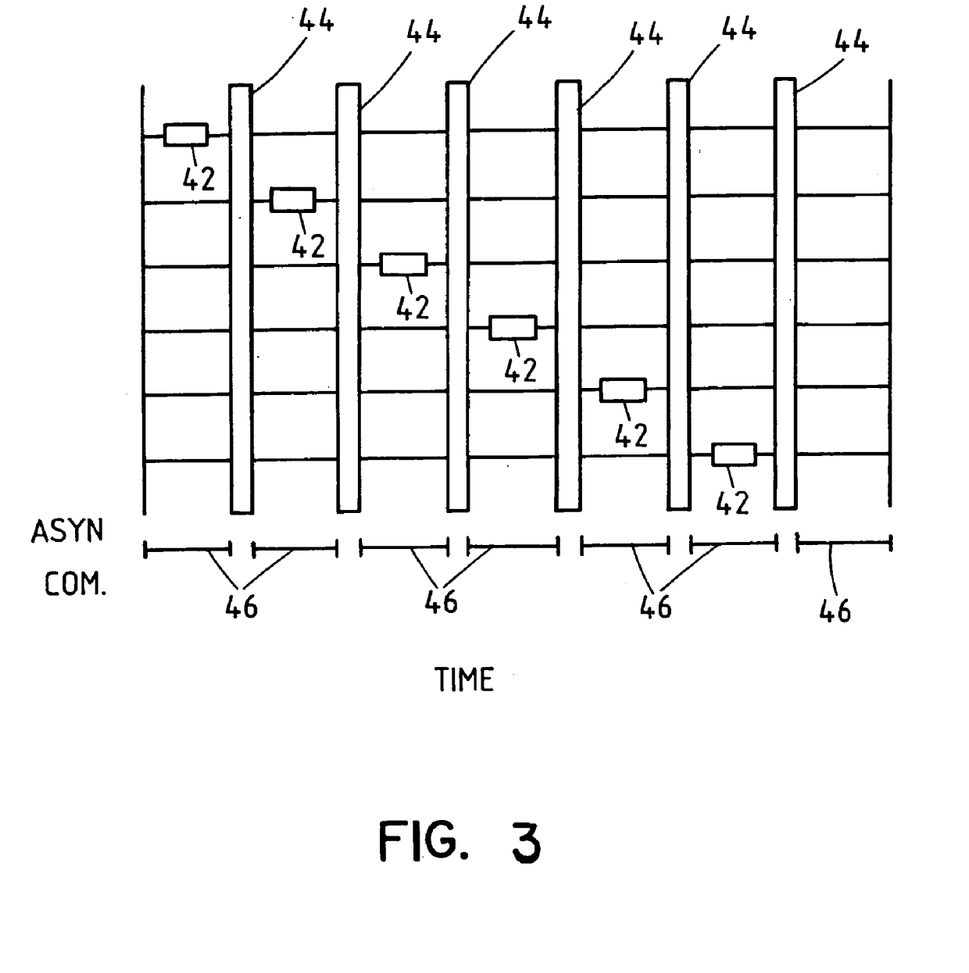
FIG. 3 is a block diagram of a set of address lists that are used by the hand-held link master device of FIG. 2 to probe for devices that have been recently added to the bus.

FIG. 3 illustrates a timing schematic depicting the times 42 at which function blocks on the bus segment 22b of FIG. 1 execute during each macrocycle of the bus segment 22b and the times 44 at which synchronous communications occur during each macrocycle of the bus segments 22b. The timing schedule also illustrates the times 46 available for asynchronous communication activities 46, which may occur during the execution times 42 of any of the function blocks and during the time at the end of the macrocycle during which no function blocks are executing and when no synchronous communications 44 are taking place on the bus segment 22b. Of course, if desired, different function blocks can be intentionally scheduled to execute at the same time and not all function blocks must publish data on the bus if, for example, no other device subscribes to the data produced by a function block.

To assure proper communication activities over the bus, each LAS periodically sends a data link time distribution message to all of the field devices connected to a segment of the bus, which enables the receiving devices to adjust their data link time to be in synchronization with one another. Between these synchronization messages, clock time is independently maintained in each device based on its own internal clock.

Figure 4:
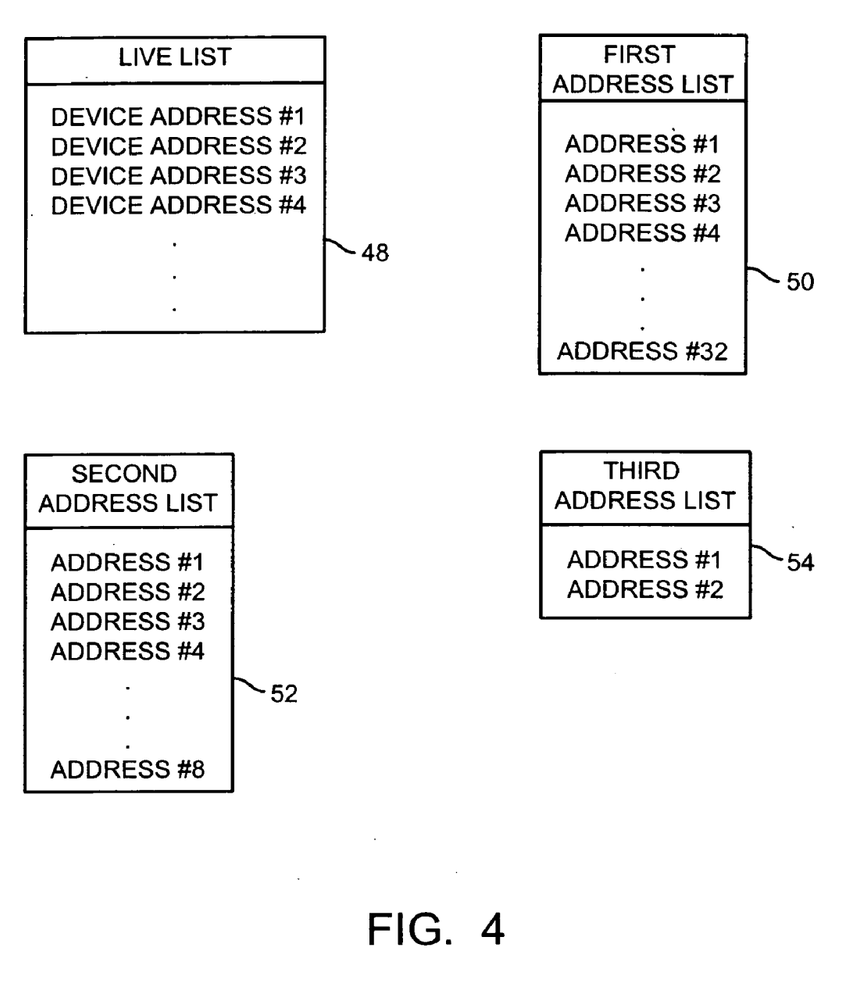
FIG. 4 is a timing schematic for a macrocycle of a segment of the communication bus of FIG. 1.

Referring now to FIG. 4, the LAS (and other link master devices 16) on each bus segment stores a "live list" 48 which is a list of all of the addresses of the devices that are connected to that segment of the bus, i.e., all of the devices that are properly responding to a pass token message. In addition, each LAS "keeps" a set of address lists that contain bus addresses that are not on the live list 48 and each of which contains a maximum number of addresses. More particularly, the primary link master device 16A, the back-up link master device 16B and the hand-held link master device each keep a first and a second address list as described above. However, the hand-held link master device 16C also keeps a third address list. The functions performed by an LAS to "keep" the address lists may be as simple as maintaining the lists with current information. Alternatively, in order to "keep" the address lists, an LAS may execute a routine that causes the address lists to be created and then maintained with current information. In either event, routines for creating and maintaining lists of data, like an address list, are well known in the art and, as a result, are not discussed further herein.

A first of the address lists 50 is reserved for storing addresses associated with permanent field devices such as host interfaces, transmitters, valves and other field devices and, in one embodiment, typically allows for a maximum number of approximately thirty-two field device addresses. A second of the address lists 52 is typically limited to eight device addresses and is used to store addresses used by temporary field devices such as handheld devices, or permanent devices that were not assigned a permanent address during configuration of the process control system. As described above, these two address lists are currently used in Fieldbus communication devices in the prior art. A third address list 54, however, may additionally be provided in the hand-held link master device 16C which includes space for, for example, two addresses that are reserved for the communication control devices, such as the primary link master device 16A and the back-up link master device 16B. Alternatively, the third address list 54 may contain any number of addresses but the maximum number of addresses in the third address list is preferably less than the maximum number of addresses in the first address list 50 and in the second address list 52.

The hand held link master device 16C, when operating as the LAS, executes a probing algorithm 56 to continually recognize devices that have been added to the bus segment 22. The probing algorithm 56 which may be implemented, for example, as a subroutine of the communication algorithm 36, is stored in memory such as the RAM 32 and is executed by the processor 24 during operation of bus communications. According to the probing algorithm 56, the hand-held LAS 16C selects an address from one of the three address lists 50, 52 or 54 and sends a probe node message to the selected address. If a device is present at the probed address and receives the probe node message, the device immediately returns a probe response message. Upon receiving the probe response message, the hand-held LAS 16C adds the device to the live list 48 and confirms receipt of the response message by sending a node activation message to the newly probed device. In addition to adding the device to the live list 48, the hand-held LAS 16C removes the probed address from the address list from which it was selected so that the address is no longer probed. A field device remains on the live list 48 as long as that field device responds properly to pass token messages. However, the hand-held LAS 16C removes a field device address from the live list 48 and returns the address to the appropriate one of the three address lists 50, 52 or 54 if the field device does not, after three successive tries, either use the token or immediately return the token to the hand-held LAS 16C. When a field device is added to or removed from the live list 48, the hand-held LAS 16C broadcasts changes in the live list 48 to all of the other link master devices 16 on the appropriate segment of the bus 22 to allow each link master device 16 to maintain a current copy of the live list 48 and the address probing lists 50, 52 and 54.

Figure 5:
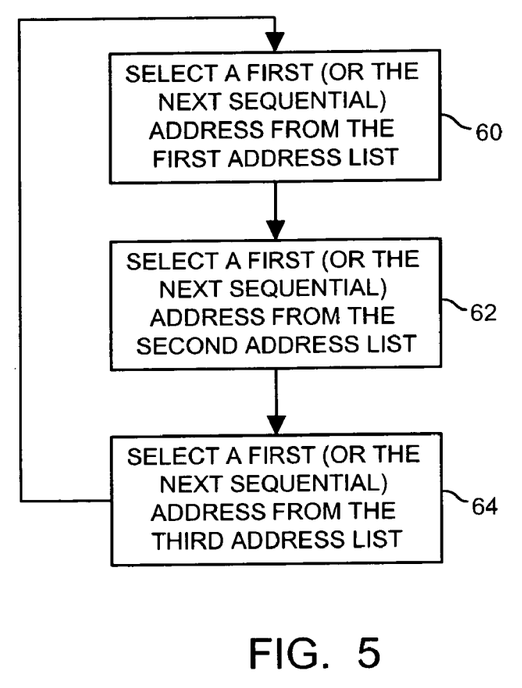
FIG. 5 is a flow chart illustrating a portion of the steps of a probing algorithm performed by the hand-held link master device of FIG. 2 to detect the presence of an additional communication control device, such as a primary or back-up link master device, that is also coupled to the bus of FIG. 1.
Figure 6:
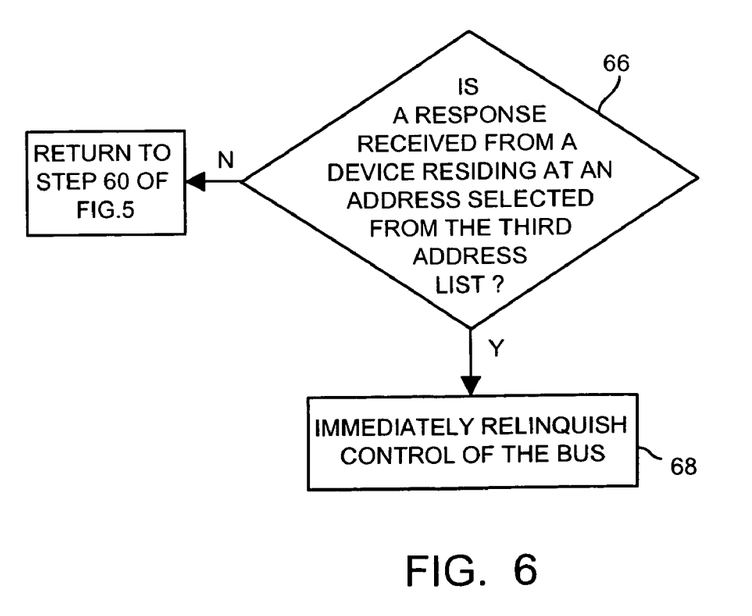
FIG. 6 is a flowchart illustrating additional steps that may be included in the probing algorithm of FIG. 5.

Referring now to FIG. 5, at least a portion of the steps of the probing algorithm 56 are illustrated in flow chart form. Specifically, the steps included in FIG. 5 represent steps of the probing algorithm 56 that control the order in which the hand-held LAS 16C selects from each of the first, second and third address lists 50, 52 and 54 to obtain an address to which a probe node message will then be transmitted. Beginning at a step 60, which may, for example, occur during a first unscheduled or asynchronous communication, the hand-held LAS selects a first address from the first address list 50 and sends a probe node message to this address. Next at a step 62, which may occur, for example, during a second unscheduled communication, the hand-held LAS 16C selects a first address from the second address list 52 and sends a probe node message to this address. Finally, at a step 64, which may occur during a third unscheduled communication, the hand-held LAS 16C selects a first address from the third address list 54 and sends a probe node message to this address. After the step 64 has been performed, control loops back to the step 60 wherein the hand-held LAS 16C now selects the next, sequential address from the first address list 50. If the last address in any of the address lists 50, 52 and 54 has been probed, then the active LAS returns or "rolls over" to the first address in that list, and continues to select addresses from the first, second and third address lists 50, 52 and 54 in the sequential and alternating manner illustrated by the steps of FIG. 5. Of course, after sending a probe node message at each of the steps 60, 62 and 64, the hand-held LAS 16C waits for a probe response message as described above. If the hand-held LAS 16C receives a response to a probe node message from a device residing at an address selected from either of the first or the second address list 50, 52 then the hand-held LAS 16C responds to the probe node message in the manner described above, i.e., by acknowledging receipt of the message and by removing the last-probed address from the address list from which it was selected and then adding the address to the live list 48. Referring also to FIG. 6 which shows a set of steps that may be included in the probing algorithm 56 and performed after execution of the step 64, if, at a step 66, the hand-held LAS 16C receives a response to a probe node message from a device residing at an address selected from the third address list 54, then the hand-held LAS 16C immediately relinquishes control of the bus at the step 68 by ceasing to communicate on the bus. After a predetermined time has elapsed during which no communication has occurred on the bus, either the back-up link master device 16B or the primary link master device 16A automatically takes control of the bus 22. Alternatively, the probed device residing at an address selected from the third address list 54 may respond to the probe node message with a request to take control of the bus 22, to which the hand-held link master device 16C may respond by relinquishing control of the bus 22.

Thus, in the event that the hand-held link master device 16C is inadvertently (or for any reason) coupled to a bus segment that is being controlled by a primary link master device 16A or a back-up link master device 16B, and if the hand held link master device 16C becomes the LAS and takes control of the bus 22, then the hand-held link master device 16C executes the probing algorithm 56 to determine whether other devices are coupled to the bus. However, as described above, because the hand-held LAS 16C does not have a current communication schedule, communication will be interrupted for most or all of the control/field devices coupled to the bus until those devices are probed. Moreover, if the interruption lasts too long, the devices may enter into fault conditions which may disable the process control system. To avoid this result, the probing algorithm ensures that the back-up link master device 16B or the primary link master device 16A regains control of the bus in a timely manner. More particularly, because the third address list 54 contains fewer addresses than the first address list 50 and the second address list 52, the probing algorithm 56 ensures that each address in the third address list 54 is probed more frequently than each address in the first address list 50 and each address in the second address list 52. For example, if the address list 54 contains a maximum of two addresses and the first and second address lists 50 and 52 contain a maximum of thirty-two and eight addresses, respectively, then, by default, because the address lists are probed in an alternating manner, each of the addresses in the third address list 54 is probed more frequently than each of the addresses in the first and second address lists 50 and 52. Preferably, the maximum number of addresses contained in the third address list 54 should be small enough to ensure that the frequency at which each of the addresses in the third address list (i.e., the list reserved for communication control devices) is probed is sufficient to prevent the devices coupled to the bus from entering into fault conditions in the event that a hand-held link master device 16C takes control of the bus from another link master device such as a primary link master device 16A or a back-up link master device 16B.

As described herein, a probe node message may be transmitted, once during each of a series of unscheduled communications. However, the steps of the probing algorithm 56 may instead be executed at any time in relation to the other routines/steps of the probing algorithm 56 or communication algorithm 36 provided that each of the addresses in the third address list 54 are probed more frequently than each of the addresses in the first and second address lists 50 and 52. In addition, although the third address list 54 is described as initially containing two addresses, the third address list may instead contain more or less than two addresses provided that the total number of addresses is small enough to cause the probing frequency to be sufficient to prevent the bus devices from reaching fault conditions in the event that control is interrupted because a hand-held link master device 16C has gained control of the bus.

It should be understood that the probing algorithm 56 could be produced in or implemented in hardware, firmware or software stored on any type of computer memory, disk or other storage device. If implemented in software, the probing algorithm 56 could be programmed using any desired programming language, and may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc.

Moreover, instead of selecting from among three device address lists, the link master may be configured to select from any other number of address lists, such as two, four, etc. as long as one of the address lists is reserved for addresses for communication control devices. In the case of two address lists, for example, one of the lists may include all of the permanent and temporary device addresses and the other may include the device addresses reserved for additional communication control devices such as link master devices. Of course, if two device address lists are used, then every other address will be selected from the address list reserved for additional communication control devices.

In addition, although the probing algorithm 56 and third address list 54 are described as being associated with/ implemented using a hand-held link master device 16C, the probing algorithm 56 and third address list 54 may instead be associated with/implemented using any type of link master device including, for example, the primary link master device 16A and a back-up link master device 16B.

Furthermore, while the communication control device and probing algorithm has been described with reference to specific examples, which are intended to be illustrative only, and not to be limiting of the invention, it will be apparent to those of ordinary skill in the art that changes, additions or deletions may be made to the disclosed embodiments without departing from the spirit and scope of the invention.

What is claimed is:

1. A communication control device for periodically sending probe messages, one at a time, via a communication bus to a plurality of device addresses to detect the presence of devices located on the bus at the device addresses, the communication control device comprising:
   a processor;
   a memory;
   a first address list containing a first set of device addresses;
   a second address list containing a second-set of device addresses;
   a third address list containing addresses reserved for communication control devices configured to control communications on the bus; and
   a routine stored in the memory and adapted to be executed by the processor to select the plurality of device addresses to which a probe message will be sent from among the first, second and third address lists, wherein the routine causes each device address in the third address list to be selected more frequently than each of the device addresses in the first and second address lists.

2. The communication control device of claim 1, wherein the routine comprises a first routine, and further including a second routine stored in the memory and adapted to be executed by the processor, wherein the second routine is further adapted to send probe messages to each of the device addresses selected from the first, second and third address lists to determine whether a device is located at each of the selected device addresses.

3. The communication control device of claim 1, wherein the routine comprises a first routine, and further including a second routine stored in the memory and adapted to be executed by the processor, wherein the second routine is adapted to send a probe message to each device address selected from the third address list, and wherein the second routine is further adapted to cause the communication control device to relinquish control of the bus upon receiving a response to a probe message sent to a device address selected from the third address list.

4. The communication control device of claim 1, wherein the third address list contains a maximum of two device addresses.

5. The communication control device of claim 1, wherein the third address list contains a maximum of three device addresses.

6. The communication control device of claim 1, wherein each of the first, second and third address lists contains a maximum number of device addresses and wherein the maximum number of device addresses contained in the third address list is less than the maximum number of device addresses contained in the first address list and is less than the maximum number of device addresses contained in the second address list.

7. A communication control device for periodically sending probe messages, one at a time, via a communication bus to a plurality of device addresses to detect the presence of devices located on the bus at the device addresses, the communication control device comprising:
   a processor;
   a memory;
   a first address list containing a first maximum number of device addresses;
   a second address list containing a second maximum number of device addresses;
   a third address list containing a maximum number of addresses reserved for communication control devices, wherein the maximum number of device addresses contained in the third address list is less than the maximum number of device addresses contained in the first address list and is less than the maximum number of device addresses contained in the second address list; and
   a routine stored in the memory and adapted to be executed by the processor to select the plurality of device addresses to which a probe message will be sent from among the first, second and third address lists in an alternating manner, wherein the routine causes each device address in the third address list to be selected more frequently than each of the device addresses in the first and second address lists.

8. The communication control device of claim 7, wherein the routine further causes each device address selected from each of the first, second and third address lists to be selected in a sequential order with roll over relative to the other device addresses selected from that list.

9. The communication control device of claim 1, wherein a frequency at which any device address in the third address list is selected is sufficient to prevent a set of active devices that are coupled to the communication bus from reaching a fault condition in the event that communication on the bus is temporarily interrupted.

10. The communication control device of claim 1, wherein the first address list contains device addresses reserved for addresses of permanent devices.

11. The communication control device of claim 1, wherein the second address list contains device addresses reserved for addresses of temporary devices.

12. The communication control device of claim 1, wherein the communication control device comprises a link master device.

13. The communication control device of claim 12, wherein the link master device comprises a hand-held link master device.

14. The communication control device of claim 12, wherein the link master device comprises a back-up link master device.

15. The communication control device of claim 1, wherein the communication control device comprises a Fieldbus device.

16. A communication system for periodically sending probe messages, one at a time, via a communication bus to a plurality of device addresses to detect the presence of devices located at the device addresses, the communication control system comprising:
   a memory;
   a first routine stored in the memory and adapted to be executed on a processor for keeping a first address list, wherein the first address list contains a first set of device addresses, and for keeping a second address list, wherein the second address list contains device addresses that are reserved for communication control devices configured to control communications on the bus; and a second routine stored in the memory and adapted to be executed on a processor to select the plurality of device addresses from the first and second address lists to which a probe message will be sent.

17. The communication control system of claim 16, wherein the second routine is further adapted to cause each of the device addresses contained in the second address list to be selected more frequently than each of the device addresses contained in the first address list.

18. The communication control system of claim 16, wherein the second routine is further adapted to send a probe message to each of the device addresses selected from the first and second address lists and wherein the second routine is further adapted to cause the communication control device to relinquish control of the bus upon receiving a response to a probe message sent to a device address selected from the second address list.

19. The communication control system of claim 16, further comprising a third routine stored in the memory and adapted to be executed by the processor and further adapted to send probe messages to each of the selected device addresses to determine whether a device is located at each of the selected device address.

20. The communication control system of claim 16, wherein the first address list further comprises a third address list wherein the third address list contains a second set of device addresses, and wherein the second routine is further adapted to cause each of the device addresses contained in the second address list to be selected more frequently than each of the device addresses stored in the first address list and stored in the second address list.

21. The communication control system of claim 16, wherein each of the first and second address lists contains a maximum number of device addresses, and wherein the maximum number of device addresses contained in the second address list is less than the maximum number of device addresses contained in the first address list.

22. A communication system for periodically sending probe messages, one at a time, via a communication bus to a plurality of device addresses to detect the presence of devices located at the device addresses, the communication control system comprising:
   a memory;
   a first routine stored in the memory and adapted to be executed on a processor for keeping a first address list, wherein the first address list contains a first set of device addresses, and for keeping a second address list, wherein the second address list contains device addresses that are reserved for communication control devices; and
   a second routine stored in the memory and adapted to be executed on a processor to select the plurality of device addresses from the first and second address lists to which a probe message will be sent in an alternating manner.

23. The communication control system of claim 16, wherein the second address list contains a maximum of two device addresses.

24. A communication system for periodically sending probe messages, one at a time, via a communication bus to a plurality of device addresses to detect the presence of devices located at the device addresses, the communication control system comprising:
   a memory;
   a first routine stored in the memory and adapted to be executed on a processor for keeping a first address list, wherein the first address list contains a first set of device addresses, and for keeping a second address list, wherein the second address list contains device addresses that are reserved for communication control devices; and
   a second routine stored in the memory and adapted to be executed on a processor to select the plurality of device addresses from the first and second address lists to which a probe message will be sent in a sequential order with roll over relative to the other device addresses selected from that list and wherein a frequency at which any device address in the second address list is selected is sufficient to prevent a set of active devices that are coupled to the communication bus from reaching a fault condition in the event that communication on the bus is interrupted.

25. The communication control system of claim 16, wherein the second routine: uses a Fieldbus communication protocol.

26. A method for controlling the order in which a plurality of device addresses are selected for transmission of a probe message on a bus to detect the presence of devices located at the device addresses on the bus, the method comprising the steps of:
   selecting device addresses from a first address list;
   selecting device addresses from a second address list; and
   selecting device addresses from a third address list, wherein the third address list contains device addresses reserved for communication control devices configured to control communications on the bus.

27. The method of claim 26, wherein each of the device addresses in the third address list is selected more frequently than each of the device addresses in the first and the second address lists.

28. The method of claim 26, further comprising the step of sending a probe message to each of the selected device addresses to determine whether a device is located at each of the selected device addresses.

29. The method of claim 28, further comprising the step of relinquishing control of the bus upon receiving a response to a probe message sent to a device address selected from the third address list.

30. The method of claim 26, wherein the steps of selecting a device address from each of the first, second and third address lists includes the step of selecting each device address in a sequential order with rollover relative to the other device addresses in that list.

31. The method of claim 26, wherein each of the first, second and third address lists contains a maximum number of device addresses, and wherein the maximum number of device addresses in the third address list is less than the maximum number of device addresses in the first address list and is less than the maximum number of device addresses in the second address list.

32. A method for controlling the order in which a plurality of device addresses are selected from a first address list and from a second address list for transmission of a probe message on a bus to detect the presence of devices located at the device addresses on the bus, the method comprising the steps of:
   keeping a first address list and a second address list, wherein the second address list comprises a list of device addresses reserved for communication control devices configured to control communications on the bus; and selecting the device addresses from the first address list and the second address list, wherein each of the device addresses in the second address list is selected more frequently than each of the device addresses in the first address list.

33. The method of claim 32, further comprising the step of sending a probe message to each of the selected device addresses to determine whether a device is located at each of the selected device addresses.

34. The method of claim 33, further comprising the step of relinquishing control of the bus upon receiving a response to a probe message send to a device address selected from the second address list.

35. The method of claim 32, wherein the first address list comprises a plurality of address lists.

36. The method of claim 32, wherein the step of selecting the device addresses from the first address list and the second address list further comprises the step of selecting each device address in a sequential order with rollover relative to the other device addresses selected from that list.

* * * * *

UNITED STATES PATENT AND TRADEMARK OFFICE
CERTIFICATE OF CORRECTION

PATENT NO. : 6,944,681 B1
APPLICATION NO. : 09/658607
DATED : September 13, 2005
INVENTOR(S) : Christensen et al.

It is certified that error appears in the above-identified patent and that said Letters Patent is hereby corrected as shown below:

In the Specification:
At Column 2, line 59 please delete "describe" and insert -- described --
At Column 5, line 51, please delete "capably" and insert -- capable --
At Column 16, line 18, please delete "routine:" and insert -- routine --

Signed and Sealed this

Twenty-first Day of November, 2006

JON W. DUDAS
*Director of the United States Patent and Trademark Office*